(12) United States Patent  
Lee et al.

(10) Patent No.: US 7,746,625 B2  
(45) Date of Patent: Jun. 29, 2010

(54) COMPUTER FRONT BEZEL

(75) Inventors: Guang-Yao Lee, Taipei Hsien (TW); Xiao-Zhong Jing, Shenzhen (CN); Qing-Zhi Yang, Shenzhen (CN); Xue-Li Cheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 156 days.

(21) Appl. No.: 12/166,259

(22) Filed: Jul. 1, 2008

(65) Prior Publication Data

US 2009/0154080 A1 Jun. 18, 2009

(51) Int. Cl.  
*G06F 1/16* (2006.01)
(52) U.S. Cl. .............................. 361/679.02; 312/223.2
(58) Field of Classification Search ............ 361/679.02, 361/724  
See application file for complete search history.

(56) References Cited

U.S. PATENT DOCUMENTS

| | | | | |
|---|---|---|---|---|
| 5,924,780 | A * | 7/1999 | Ammon et al. ........... | 312/223.2 |
| 6,132,019 | A * | 10/2000 | Kim et al. ................ | 312/223.2 |
| 6,711,008 | B2 * | 3/2004 | Teng et al. ............. | 361/679.02 |
| 6,891,720 | B2 * | 5/2005 | Voon et al. ............. | 361/679.31 |
| 7,254,821 | B2 * | 8/2007 | Chen et al. .................. | 720/655 |
| 7,327,566 | B2 * | 2/2008 | Zhao ..................... | 361/679.33 |
| 7,367,638 | B2 * | 5/2008 | Marroquin et al. ....... | 312/223.2 |
| 7,375,955 | B2 * | 5/2008 | Xu ........................ | 361/679.55 |
| 2005/0264989 | A1 * | 12/2005 | Chen et al. ................... | 361/683 |
| 2006/0220504 | A1 * | 10/2006 | Zhao ....................... | 312/223.2 |
| 2006/0245159 | A1 * | 11/2006 | Lin et al. ..................... | 361/685 |
| 2006/0261711 | A1 * | 11/2006 | Li et al. .................... | 312/223.2 |

* cited by examiner

*Primary Examiner*—Lisa Lea-Edmonds  
(74) *Attorney, Agent, or Firm*—D. Austin Bonderer

(57) ABSTRACT

A computer front bezel includes a main body, a sliding cover, and two elastic members. The main body defines two substantially opposite sliding grooves. The sliding cover includes two posts slidably received in the sliding grooves of the main body respectively. The two elastic members are connected to the sliding cover and the main body. One end of each of the elastic members is rotatably connected to the main body, and the other end of each of the elastic members is rotatably connected to the sliding cover. The sliding cover is capable of moving between a first, a second and a third state. The first state is that the sliding cover is in a closed position and the two posts are approximately located at first end of the grooves. The second state is that the sliding cover is between the first and third state, and the elastic members exert more force than when the sliding cover is in the first or third state. The third state is that the sliding cover is in an open position and the posts are approximately located at second end of the grooves.

10 Claims, 5 Drawing Sheets

COMPUTER FRONT BEZEL

BACKGROUND

1. Field of the Invention

The present invention relates to computer front bezels, and more particularly to a computer front bezel including a sliding cover.

2. Description of Related Art

A computer front bezel usually includes a sliding cover to shield an additional component, such as a CD-ROM drive, when the additional component is not in use. A sliding cover typically requires a complicated structure to allow movement thereof while remaining attached the bezel.

SUMMARY

An exemplary computer front bezel includes a main body, a sliding cover, and two elastic members. The main body defines two substantially opposite sliding grooves. The sliding cover includes two posts slidably received in the sliding grooves of the main body respectively. The two elastic members are connected to the sliding cover and the main body. One end of each of the elastic members is rotatably connected to the main body, and the other end of each of the elastic members is rotatably connected to the sliding cover. The sliding cover is capable of moving between a first, a second and a third state. The first state is that the sliding cover is in a closed position and the two posts are approximately located at first end of the grooves. The second state is that the sliding cover is between the first and third state, and the elastic members exert more force than when the sliding cover is in the first or third state. The third state is that the sliding cover is in an open position and the posts are approximately located at second end of the grooves.

DETAILED DESCRIPTION

Figure 1:
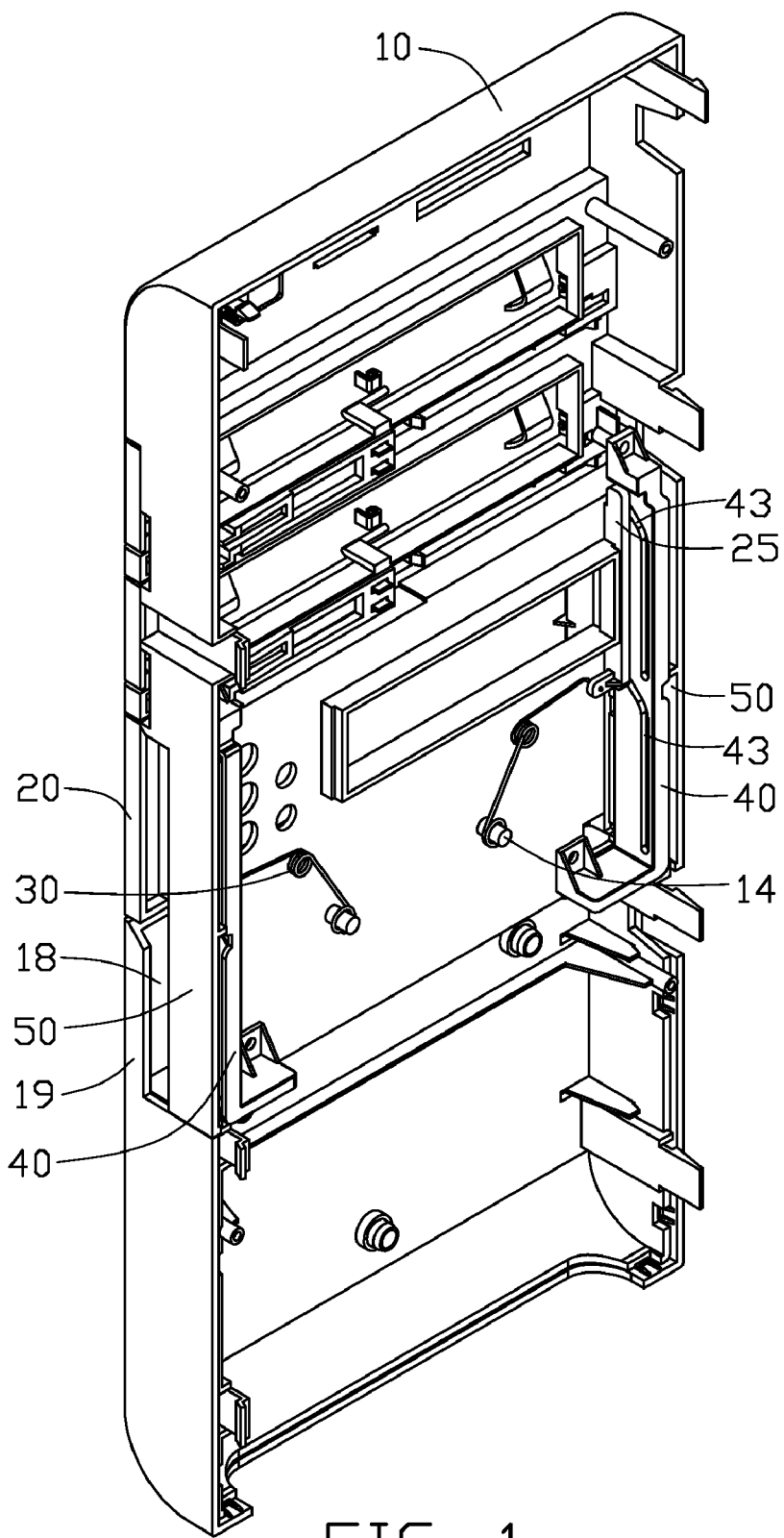
FIG. 1 is an assembled, isometric view of a computer front bezel with a sliding cover in accordance with an embodiment of the present invention.
Figure 2:
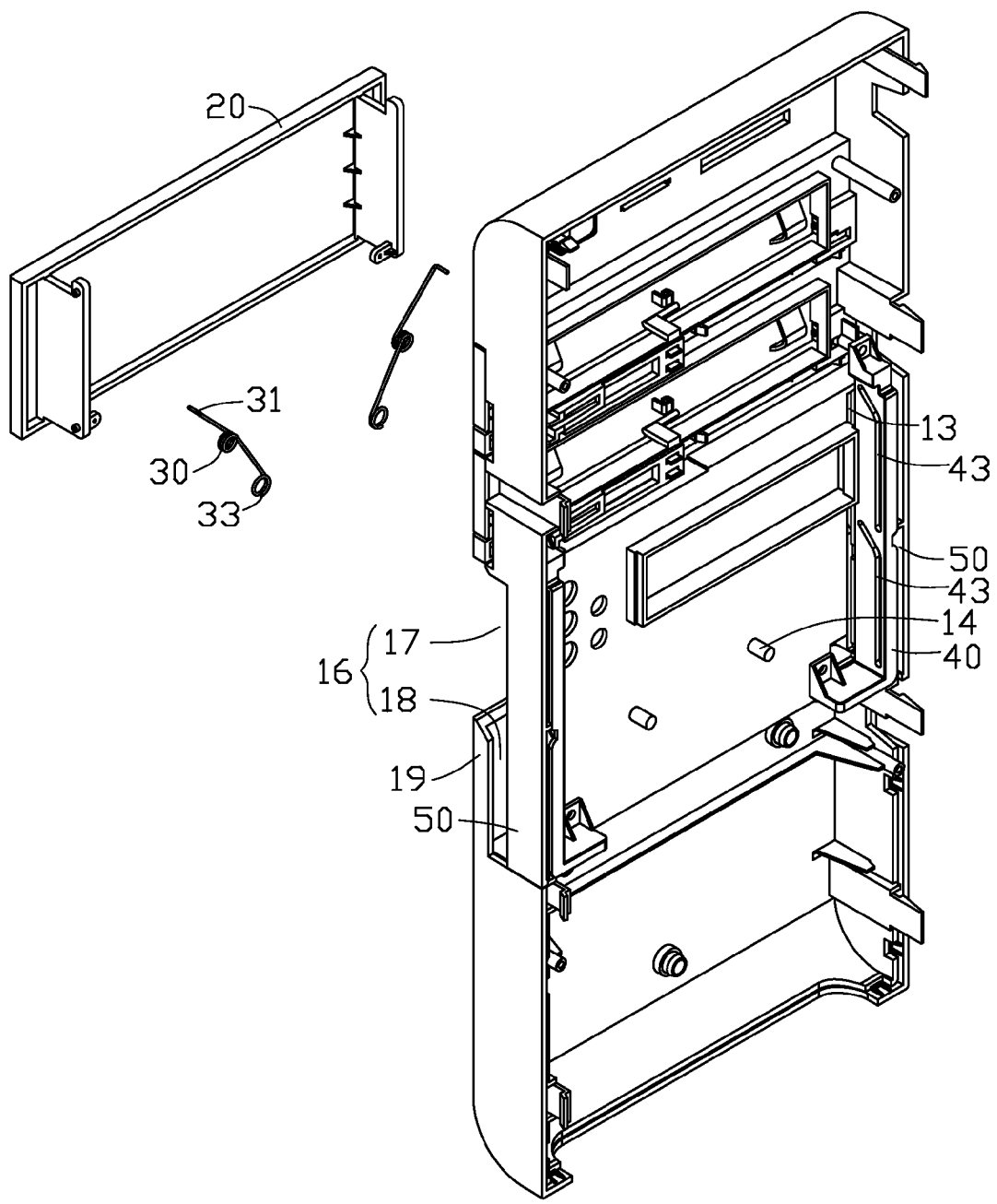
FIG. 2 is an exploded view of FIG. 1.

Referring to FIGS. 1 and 2, in a first embodiment of the invention, a computer front bezel includes a main body 10 (Not shown in FIG. 2), a sliding cover 20 slidably attached to the main body 10, two elastic members 30 and two mounting plates 40.

A recessed portion 16 is defined in the middle of the main body 10. The main body 10 includes two side panels 50, and a shielding plate 19 formed in front of the lower portion of the recessed portion 16. The recessed portion 16 includes an interface-holding portion 17, and a receiving slot 18 between the recessed portion 16 and the shielding plate 19. The interface-holding portion 17 is the upper portion of the recessed portion 16. The interface-holding portion 17 defines a plurality of holes for holding peripheral components, such as a CD-ROM drive, USB ports, etc. The recessed portion 16 defines a hole 13 adjacent each side panel 50. Two mounting plates 40 are assembled between each side panel 50 and the corresponding hole 13 respectively. A sidewall of each mounting plate 40 facing the opposite mounting plate 40 defines two sliding grooves 43 vertically spaced apart from each other. The upper portion of each sliding groove 43 is arced. The lower portion of each sliding groove 43 is straight and vertical. Two horizontally-spaced shafts 14 are formed on the inside surface of the main body 10 below the interface-holding portion 17.

The elastic members 30 are torsion springs. The elastic members 30 each include a hook end 31, and a ring end 33.

Figure 3:
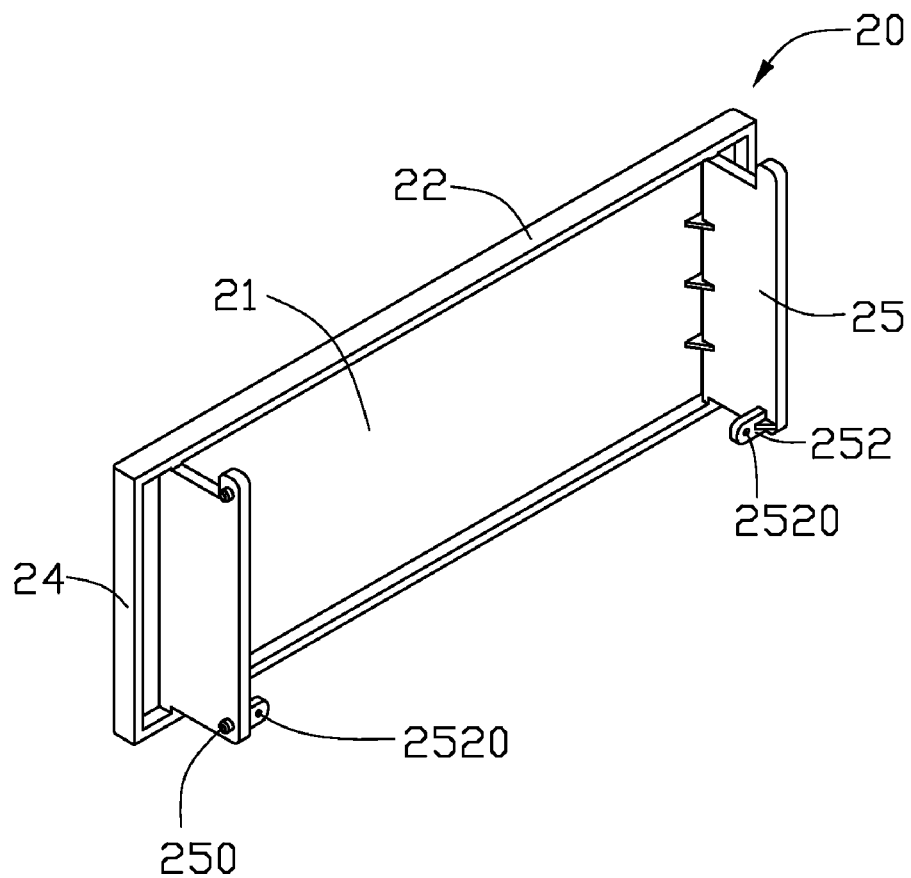
FIG. 3 is an enlarged view of the sliding cover of FIG. 2.

Referring also to FIG. 3, the sliding cover 20 includes an oblong base 21 covering the interface-holding portion 17, and sidewalls 22 and 24 extend from the edges of the base 21 respectively. A plate 25 is formed perpendicularly extending from the inside surface of the base 21 nearby each second sidewall 24. Two vertically-spaced posts 250 are formed on the outside surface of each plate 25. The distance between the two posts 250 of the same plate 25 is such that the two posts 250 may simultaneously engage in a respective one of the two sliding grooves 43. The lower corner portion of the inside surface of each plate 25 away from the base 21 has a tab 252 protruded therefrom parallel to the base 21. A through hole 2520 is defined in each tab 252.

Referring to FIG. 1, each plate 25 of the sliding cover 20 is extended through the holes 13 of the main body 10 respectively, and the two posts 250 of each plate 25 are slidably inserted into the corresponding sliding grooves 43 respectively. The hook end 31 of each elastic member 30 is inserted into the through hole 2520 of the corresponding tab 252 of the plate 25, and the ring end 33 of each elastic member 30 is rotatably coiled around the corresponding shaft 14 of the main body 10. The posts 250 of the plates 25 are located in the arced portion of the corresponding sliding groove 43 respectively. The shielding plate 19 of the main body 10 supports and prevents the sliding cover 20 from sliding into the receiving slot 18, and the sliding cover 20 covers the interface-holding portion 17. The elastic members 30 are in a first condition being only slightly deformed or not at all.

Figure 4:
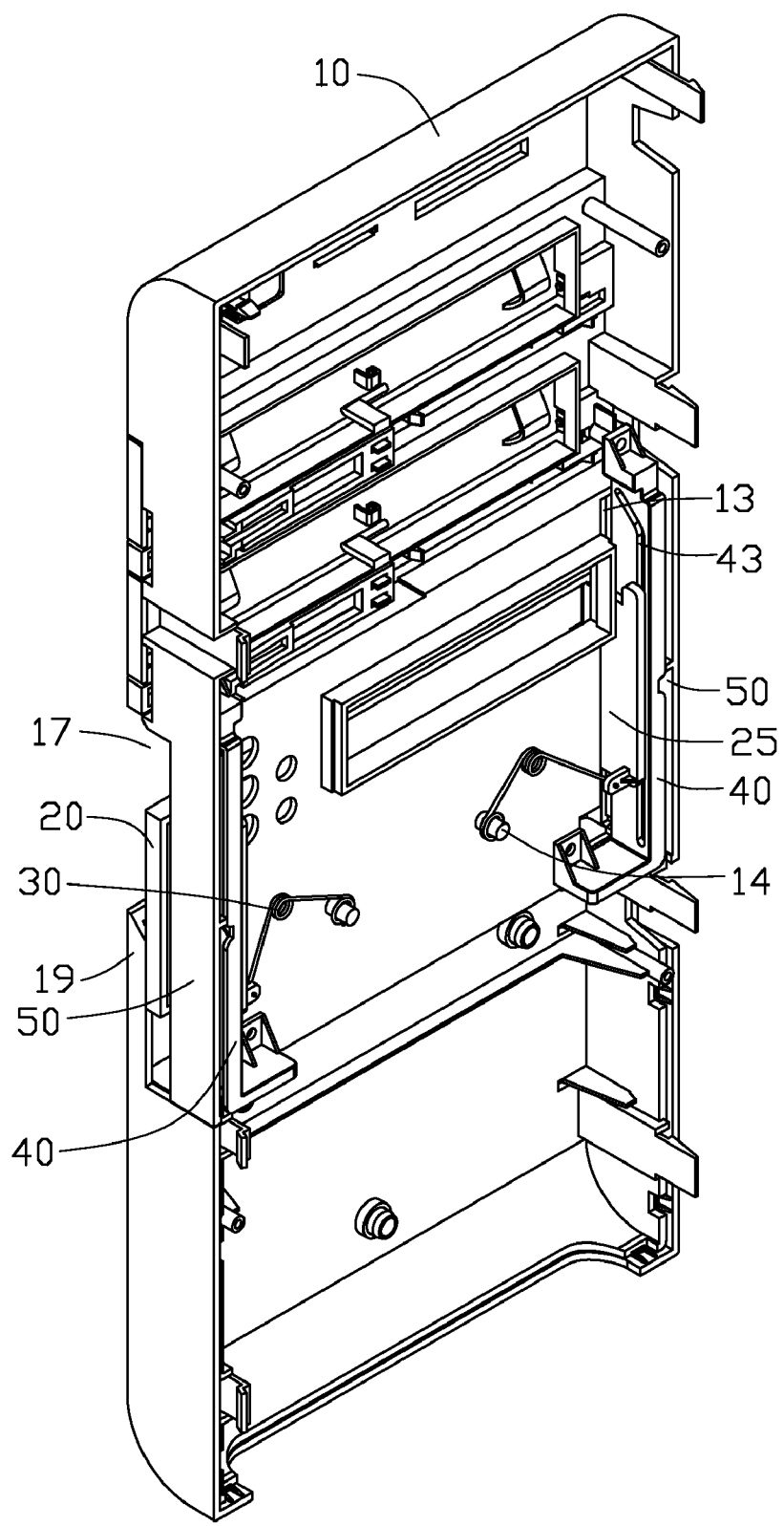
FIG. 4 and FIG. 5 are isometric views, respectively showing the sliding cover at different positions.
Figure 5:
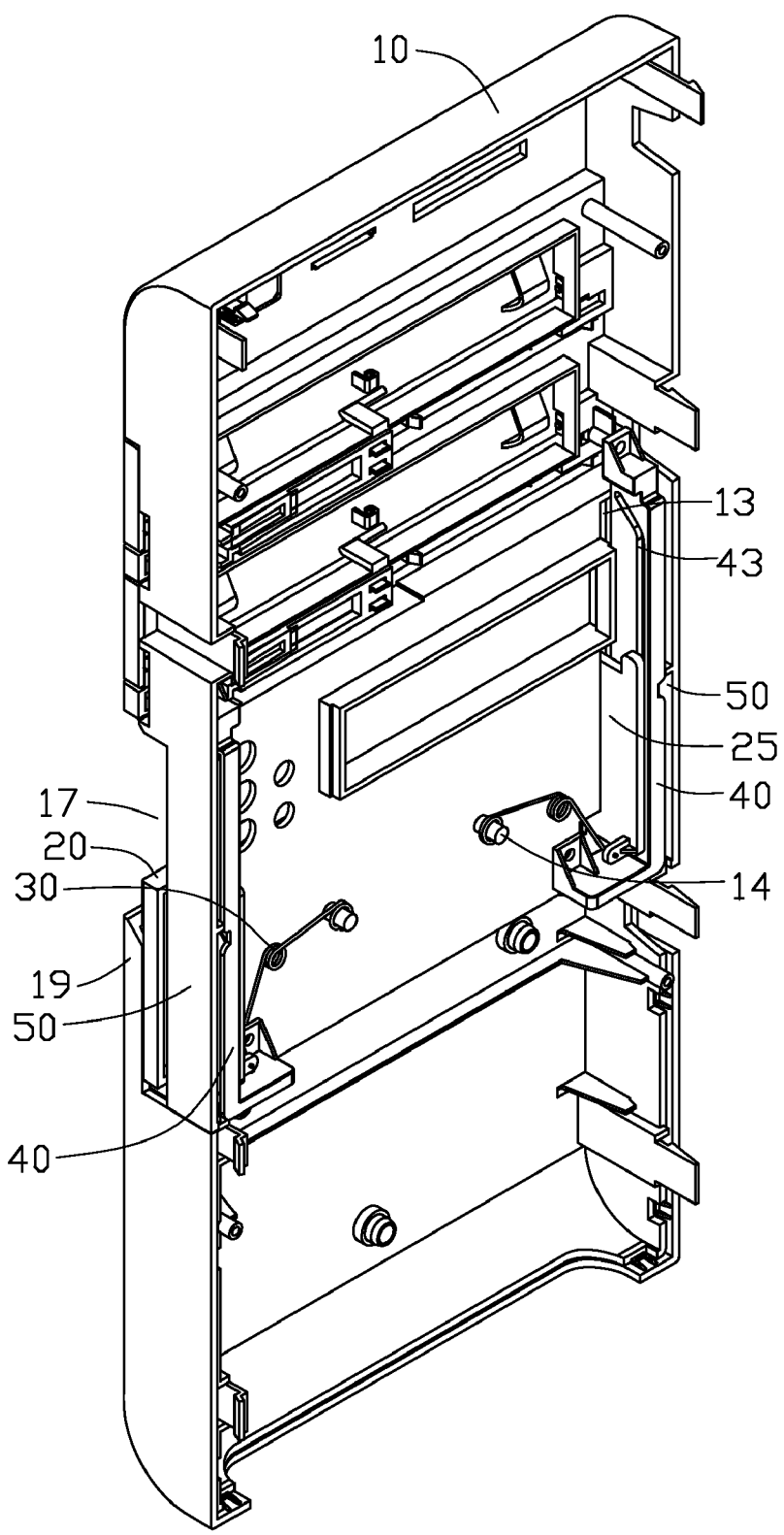

Referring to FIGS. 4 and 5, to open the sliding cover 20, it should be pushed in and down at the same time so that the posts 250 can slide from the arced portions to the vertically straight portions of the sliding grooves 43 until the cover 20 is received in the receiving slot 18 between the recessed portion 16 and the shielding plate 19. During opening of the cover 20, the ring end 33 of each elastic member 30 rotates around the corresponding shaft 14 of the main body 10, and the hook end 31 slides from top to bottom with the sliding cover 20. The perpendicular distance between the shaft 14 and the corresponding mounting plate 40 is invariable, so the elastic members 30 are pressed and swing from up to down. With the sliding cover 20 slid down, and the tab 252 and the shaft 14 are at the same horizontal line, the elastic members 30 are at most elastically deformed condition. When the tab 252 passes beyond the horizontal line, the elastic members 30 are restored, and urge the sliding cover 20 to slide down until the posts 250 get to the bottom of the vertical portions of the sliding grooves 43, and the interface-holding portion 17 is exposed. At this time the elastic members 30 are in a third condition being only slightly elastically deformed or not at all (see FIG. 5). In order to cover the interface-holding portion 17 when in the third condition, a user will push the sliding cover 20 up to make the protrusive plate 252 higher than the shaft 14, then the elastic members 30 are restored to push the sliding cover 20 to slide until the protrusive posts 250 get to the top of the arced portions of the sliding grooves 43, and the interface-holding portion 17 is covered.

In a second embodiment, the two mounting plates 40 of the first embodiment are omitted. The sliding grooves 43 are defined in the inside wall of the two side panels 50 respectively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer front bezel comprising:
   a main body defining two substantially opposite sliding grooves;
   a sliding cover comprising two posts slidably received in the sliding grooves of the main body respectively; and
   two elastic members connected to the sliding cover to the main body, wherein one end of each of the elastic members rotatably connected to the main body, and the other end of each of the elastic members rotatably connected to the sliding cover; and the cover is capable of moving between a first, a second and a third state,
   wherein the first state comprises the sliding cover being in a closed position and the two posts are approximately located at first end of the grooves; the second state comprises the cover being between the first and third state, and the elastic members exerts more force than when the sliding cover is in the first or third state; the third state comprises the sliding cover being in an open position and the posts are approximately located at the second end of the sliding grooves.

2. The computer front bezel as claimed in claim 1, wherein the main body includes a recessed portion in the middle thereof;
   a shielding plate in front of the lower portion of the recessed portion; and
   the space between the recessed portion and the shielding plate defines a receiving slot, the sliding cover is slidably received in the receiving slot.

3. The computer front bezel as claimed in claim 2, wherein the recessed portion defines a hole adjacent each side panel respectively;
   the sliding cover includes two plates; and
   the two posts are formed on the outside surface of each of the two plates respectively, each of the two plates of the sliding cover extends though the corresponding hole and the posts slidably insert into the corresponding sliding grooves.

4. The computer front bezel as claimed in claim 3, wherein the top portion of each sliding groove is set at a different angle that the lower portion of each sliding groove.

5. The computer front bezel as claimed in claim 3, wherein the main body comprises two shafts;
   the inside surface of each of the two plates forms a tab defining a through hole;
   the elastic members are torsion springs each of the elastic members comprising a hook end and a ring end;
   the hook ends are received in the through holes of the tabs, and the ring ends are located around the corresponding shafts of the main body, when the tabs aligns with the shafts, the elastic members are at the most elastically deformed state.

6. The computer front bezel as claimed in claim 5, wherein the first state and third state that the elastic members are slightly elastically deformed.

7. The computer front bezel as claimed in claim 5, wherein the first and third state is that the elastic members are not deformed.

8. The computer front bezel as claimed in claim 5, wherein the elastic members are slightly deformed in either the first or third state.

9. The computer front bezel as claimed in claim 8, wherein the elastic members are two torsion springs, when the elastic members are at the second state, the two ends of each of the elastic members are at the substantially same level.

10. A computer front bezel comprising:
    a main body;
    two mounting plates assembled on the main body and each of the two mounting plates defining a sliding groove;
    a sliding cover comprising two posts slidably received in the sliding grooves of the mounting plates; and
    two elastic members connected to the sliding cover and the mounting plates, wherein one end of each of the elastic members rotatably connected to the corresponding mounting plate, the other end of each of the elastic members rotatably connected to the sliding cover; and the sliding cover is capable of moving between a first, a second and a third state,
    wherein the first state comprises the sliding cover being in a closed position and the two posts are approximately located at first end of the grooves; the second state comprises the sliding cover being between the first and third state, and the elastic members exerts more force than when the sliding cover is in the first or third state; the third state comprises the sliding cover being in an open position and the posts are approximately located at second end of the grooves.

* * * * *